United States Patent [19]

Miyashita et al.

[11] Patent Number: 4,756,673
[45] Date of Patent: Jul. 12, 1988

[54] TURBOCHARGER

[75] Inventors: Kazuya Miyashita, Chiba; Nobuyuki Ikeya, Tokyo; Toshihiko Kitazawa, Omiya, all of Japan

[73] Assignee: Ishikawajima-Harima Jukogyo Kabushiki Kaisha, Tokyo, Japan

[21] Appl. No.: 45,167

[22] Filed: Apr. 24, 1987

Related U.S. Application Data

[63] Continuation of Ser. No. 771,049, Aug. 30, 1985, abandoned.

[30] Foreign Application Priority Data

Sep. 3, 1984 [JP] Japan .................. 59-132773[U]

[51] Int. Cl.$^4$ ........................................... F04B 17/00
[52] U.S. Cl. ................................................. 417/406
[58] Field of Search ...................... 417/405, 406, 407; 384/99, 518, 519, 539, 563

[56] References Cited

U.S. PATENT DOCUMENTS

| Re. 24,810 | 4/1960 | Buchi | 417/406 |
| 2,390,506 | 12/1945 | Buchi | 417/406 |
| 2,709,893 | 6/1955 | Birmann | 417/406 |
| 4,527,912 | 7/1985 | Klusman | 384/99 |
| 4,553,855 | 11/1985 | DeChoundhury | 384/99 |

Primary Examiner—Louis J. Casaregola
Assistant Examiner—Timothy S. Thorpe

[57] ABSTRACT

In a turbocharger of the type in which a turbine and a compressor are disposed in back-to-back relationship and bearings are disposed on the suction side of the compressor, the turbine and the compressor are isolated thermally from each other; the service life of the antifriction bearings is increased; lubrication oil sealability is improved; and machining of a shaft is facilitated.

4 Claims, 3 Drawing Sheets

TURBOCHARGER

This application is a continuation of application Ser. No. 771,049, filed 8/30/85, now abandoned.

BACKGROUND OF THE INVENTION

The present invention relates to a cantilever turbocharger in which a turbine and a compressor are disposed in back-to-back relationship and a bearing is disposed on the side of suction (on the side of the compressor).

In the conventional turbochargers, a bearing casing incorporating bearings is interposed between a turbine casing and a compressor casing so that heat from the turbine is not directly transmitted to the compressor but to the bearings so that some countermeasures must be taken so as to protect them.

In order to prevent the bearing from being overheated, there has been devised and demonstrated a cantilever type turbocharger in which the turbine and the compressor are disposed in back-to-back relationship and the bearing is disposed on the suction side. However, with the cantilever type turbocharger, heat from the turbine is transmitted to the compressor so that the temperature of the compressor is increased and consequently the efficiency is considerably decreased. The decrease in efficiency includes an apparent decrease in efficiency due to heating after the discharge of compressed air, but there still remains the problem that because of the increase in specific volume of intake air, the supercharging effect on the displacement (reciprocating) type engine is adversely affected. In addition, the turbocharger is of the cantilever type so that the load exerted on a support on the side of the compressor is very high. As a result, the temperature of the antifriction bearing such as ball bearing rises so that the service life thereof which is in general short becomes shorter.

In the cantilever type turbocharger of the type described, the antifriction bearing is directly supported by a bearing housing disposed within the bearing casing so that no damper mechanism for absorbing the vibration caused by the unbalance of the turbine shaft works and consequently durability of the antifriction bearing which is weak under vibration is adversely affected. Furthermore, in order to lubricate the antifriction bearing, the capillary action of a wick is utilized so that the quantity of lubricating oil supplied to the antifriction bearing is very small. Therefore, there arises the problem that the lubricating oil is not sufficiently supplied to the antifriction bearing and the turbine shaft which is rotating at a high speed so that the service life of the antifriction bearing is shortened. Furthermore there is the problem that since the antifriction bearing is of the shaft-groove type without proper inner race, it is difficult to machine the shaft.

In view of the above, in a turbocharger of the type in which a turbine and a compressor are disposed in back-to-back relationship and a bearing is disposed on the suction side, a first object of the present invention is to provide a turbocharger in which a water-cooled casing is interposed between a turbine casing and a compressor casing so that the effect of shielding thermally between the turbine and compressor is improved and consequently the supercharging efficiency and the service life of the bearing can be improved and in which a cooling device with the water-cooled casing simple in construction is provided.

A second object of the present invention is to provide a turbocharger in which the life of the antifriction bearing is increased and which is provided with a bearing device which can improve sealability of a lubricating oil and make it simple to machine a shaft.

The above and other objects, effects, features and advantages of the present invention will become more apparent from the following description of some preferred embodiments thereof taken in conjunction with the accompanying drawings.

DETAILED DESCRIPTION OF THE PREFERRED EMBODIMENTS

Figure 1:
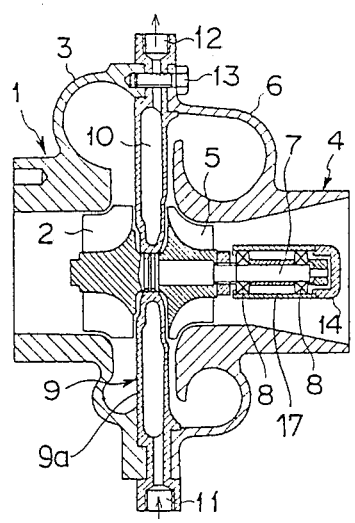
FIG. 1 is a sectional view of a first embodiment of a turbocharger in accordance with the present invention.
Figure 2:
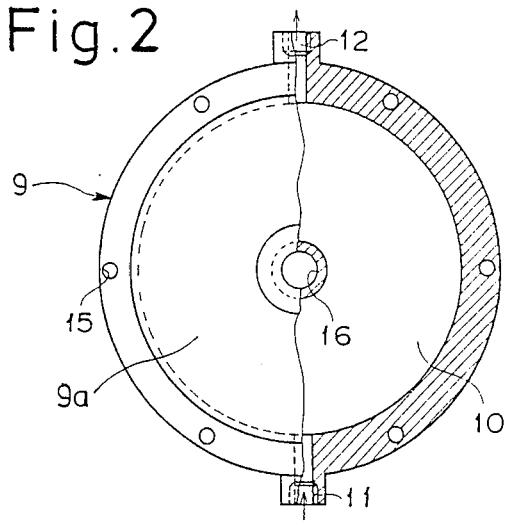
FIG. 2 is a front view, partly in section, of a water cooled casing shown in FIG. 1.

First Embodiment, FIGS. 1 and 2

FIG. 1 shows a first embodiment of the present invention. A turbine 1 comprises a turbine wheel 2 and a turbine casing 3 and a compressor 4 comprises a compressor wheel 5 and a compressor casing 6. A turbine shaft 7 is integrally joined to the turbine wheel 2 carries the compressor wheel 5 and is supported by antifriction bearings 8 such as ball or roller bearings which are disposed within a bearing housing 17 which in turn is disposed in a bearing casing integrated into the compressor casing 6 on the suction side. Thus the turbine shaft 7 is supported just like a cantilever. A water-cooled casing 9 has partition walls 9a and is interposed between the turbine 1 and the compressor 4. The water-cooled casing 9 is made in one piece and has a cavity 10. The water-cooled casing 9 has a cooling water inlet 11 and a cooling water outlet 12. The turbine casing 3, the compressor casing 6 and the water-cooled casing 9 are securely joined together by means of bolts 13. The housing 17 is fitted with a bearing cap 14. Referring next to FIG. 2, the bolts 13 are inserted into bolt holes 15, respectively, and the turbine shaft 7 is inserted into a shaft hole 16.

In the conventional turbochargers, a turbine back plate and a compressor back plate are fabricated independently of each other, but according to the first embodiment of the present invention as shown in FIG. 1, the one-piece water-cooled casing 9 which is fabricated for example by casting serves as the turbine and compressor back plates. As seen from FIGS. 1 and 2, the cooling water inlet 11 is formed at the bottom of the water-cooled chamber 9 while the cooling water outlet 12 at the top thereof as a principle. Part of the cooling water which cools the engine is made to flow into the inlet 11 and through the cavity 10 of the casing 9 and is discharged from the outlet 12. Even after the engine has been stopped, the cooling water remains in the cavity 10 and naturally circulates so that the temperature rise is very slow.

The outer walls (flange) of the water-cooled casing 9, of the turbine casing 3 and of the compressor casing 6 are securely joined together by means of the bolts 13 (In the first embodiment, one set consisting of the three outer walls are joined together.) The water-cooled casing 9 is provided with, in principle, one cooling water inlet 11 and one cooling water outlet 12 in diametrically spaced apart relationship, but it is to be understood that for example depending upon engine-setting conditions or if a core is needed when the water-cooled casing 9 is cast, the number of cooling water inlets and outlets may be increased. In this case, the cooling water inlets and outlets which are not used may be closed with plugs. In a prior art turbocharger, a variable nozzle mechanism is interposed between the turbine and compressor back plates, but in the embodiment as shown in FIG. 1 it is impossible to install such variable nozzle mechanism. However, in the first embodiment, the variable nozzle mechanism may be disposed on the exhaust side of the turbine casing (See FIG. 4 which will be explained hereinafter).

In the first embodiment as shown in FIG. 1, the water-cooled casing 9 is interposed between the turbine 1 and the compressor 4 so that the temperature rise of the compressor 4 can be suppressed by the water-cooled casing 9. Furthermore, the temperature rise of the bearings 8 can be also suppressed. Since the heavy load is exerted on the bearing 8 on the side of the supporting point of the compressor, the temperature rise of this bearing must be minimized. The present invention can solve this problem. As seen from FIG. 2, the construction of the water-cooled casing 9 is very simple.

Figure 3:
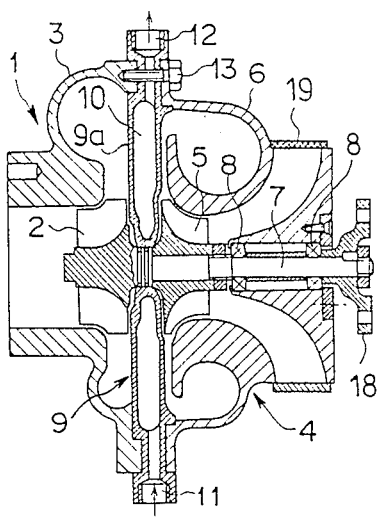
FIG. 3 is a sectional view of a second embodiment of the present invention.

Second Embodiment, FIG. 3

FIG. 3 shows a second embodiment of the present invention. Reference numeral 18 designates a shaft coupling; and 19, an air filter. That is, the turbine shaft 7 extends beyond the compressor 4 to carry the shaft coupling 18. The merit that the turbine shaft 7 is supported like a cantilever is utilized so that the free end of the turbine shaft 7 is drivingly coupled to a generator, a motor or a gear train. Thus various types of turbocharger systems may be provided according to the present invention.

Figure 4:
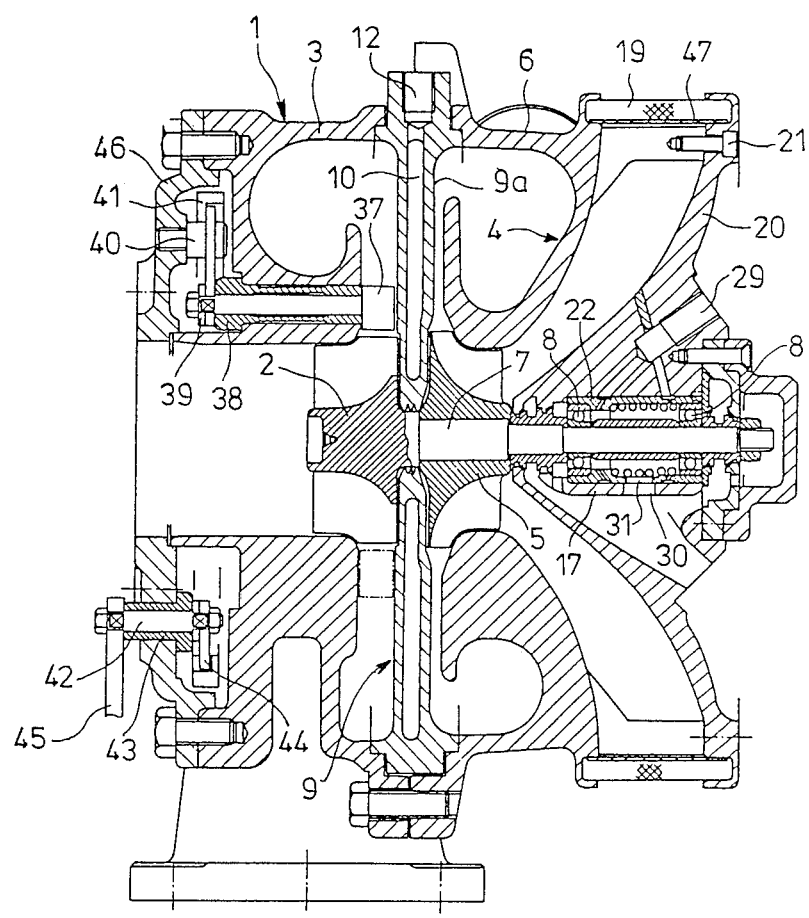
FIG. 4 is a longitudinal sectional view of a third embodiment of the present invention.
Figure 5:
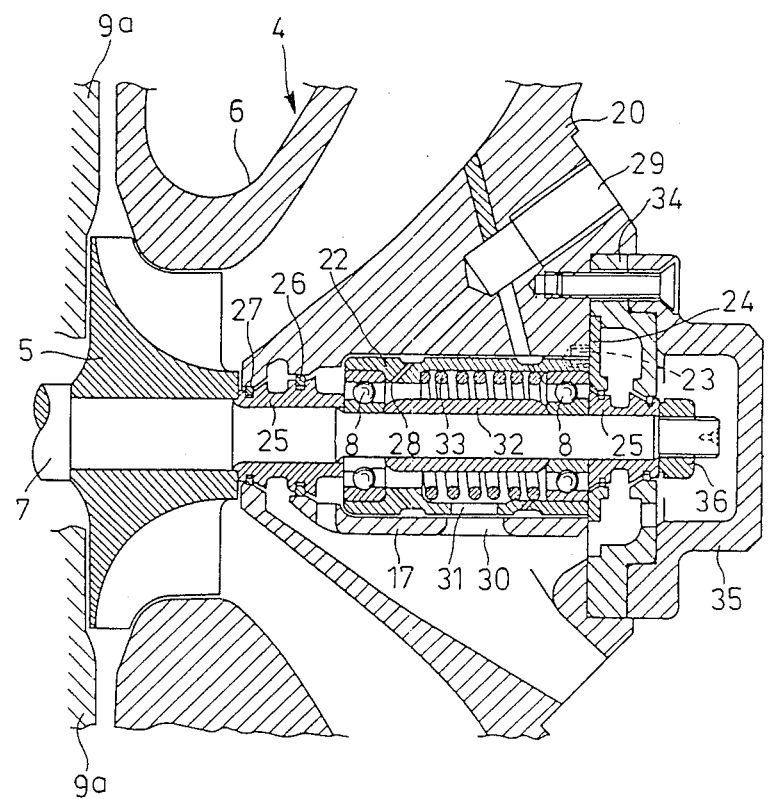
FIG. 5 is a partial longitudinal sectional view, on enlarged scale, thereof.

Third Embodiment, FIGS. 4 and 5

FIGS. 4 and 5 show a third embodiment of the present invention. A bearing casing 20 which is securely joined to the compressor casing 6 by means of bolts 21 has a bearing housing 17 disposed at a lower portion thereof and an oil film damper 22 which is so disposed within the bearing housing 17 as to float, is made in one piece and supports a pair of bearings 8 which are spaced apart horizontally from each other by a suitable distance. As shown on enlarged scale in Fig. 5, the outer diameter of the damper 22 is slightly smaller than the inner diameter of the bearing housing 17.

Referring still to FIG. 5, reference numeral 23 designates a restriction pin which is loosely fitted into a pin hole extending through the outer surface of the damper 22 and the inner surface of the bearing housing 17; 25, oil throwers disposed at the ends of the bearing housing 17; 26 and 27, seal rings sandwiching the oil thrower 25 in a stepped manner; 28, a small hole formed through the cylindrical wall of the damper 22 for effecting the jet lubricating with part of the lubricating oil film formed between the bearing housing 17 and the oil film damper 22; 29, an oil inlet formed in the bearing casing 20; 30, an oil discharge outlet formed at the bottom of the bearing housing 17; 31, an oil discharge port formed through the cylindrical wall of the damper 22 and in communication with the oil discharge outlet 30; 32, a bearing spacer; 33, a coiled spring adapted to preload the antifriction bearings 8 in the axial direction; 34, a seal plate; 35, a shaft-end cover; and 36, a nut screwed onto the end of the turbine shaft 7.

Referring back to FIG. 4, a variable nozzle mechanism is disposed on the outlet side of the turbine. More specifically, in FIG. 4, reference numeral 37 designates a turbine nozzle; 38, a nozzle bearing; 39, a nozzle link plate; 40, a centering bolt; 41, a nozzle drive ring; 42, a drive shaft; 43, a bearing for the drive shaft 42; 44, a link plate on the side of the ring; 45, a drive lever; and 46, a cover. The suction port of the compressor is provided with a suction wire gauze 47 and the filter 19.

Referring to FIG. 5, the left, and right oil throwers 25 as shown are different in size, but are similar in shape and disposed symmetrically. For the sake of simplicity, only the sealing rings 26 and 27 for the left oil thrower 25 are labelled; the seal rings for the right oil thrower 25 are different in size from the rings 26 and 27 for the left one but are similar in shape to them. Same reference numerals are used to designate similar parts throughout the figures.

In the bearing device for the turbocharger with the construction described above, a pair of antifriction bearings 8 are not disposed on the turbine side, but on the compressor side and the water-cooled casing 9 is interposed between the turbine and compressor casings 3 and 6 so that the bearings 8 are protected against a thermal problem due to the high temperature gas on the turbine side. Furthermore, the one-piece oil damper 22 which supports the bearings 8 is in the floating state because of the oil film formed between the damper 22 and the bearing housing 17 so that the damper 22 can absorb vibrations caused by the unbalance of the turbine shaft 7. Thus the stable rotation of the turbine shaft can be ensured. Moreover, the restriction pin 23 is provided to restrict the rotation of the damper 22. As a result, the damper 22 is not rotated, but is not so restricted as to adversely affect the vibration absorption effect of the damper 22. More specifically, the outer diameter of the restriction pin 23 is smaller than the inner diameter of the mating pin hole so that the pin 23 is loosely fitted into the pin hole so that the pin 23 can prevent the rotation of the damper 22, but will not adversely affect the vibration absorption capability thereof. The lubricating oil is discharged through a number of small holes 28 formed through the cylindrical wall of the damper 22 toward the bearings 8 in the form of a jet so that, as compared with the conventional wick lubrication, the lubrication efficiency can be remarkably improved, whereby the service life of the bearings 8 can be increased. The oil throwers 25 are disposed at the ends, respectively, of the bearing portion and each oil thrower 25 is sandwiched by the seal rings 26 and 27 which are stepped relative to each other so that the positive oil sealing is ensured. In addition, the damper 22 has the oil discharge outlet 31 in communication with the oil discharge port 30 of the bearing housing 17 so that the mechanical losses due to the accumulation of the lubricating oil in the damper 22 can be minimized and the lubricating oil can be discharged smoothly, whereby the above-described oil sealability is further improved. According to the present invention, the antifriction bearings 8 are not of the shaft-groove type as in the prior art and each comprises an inner race, balls and an outer race. That is, the bearings 8 are conventional ones so that it is not needed to machine the grooves into the surface of the turbine shaft 7.

The effects, features and advantages of the present invention may be summarized as follows:

(I) The water-cooled casing is interposed between the turbine and compressor which in turn are disposed in back-to-back relationship so that the transmission of the heat from the turbine to the compressor may be minimized. As a result, owing to the temperature suppression effect at the suction, not only the apparent efficiency but also the true efficiency of the compressor are improved and the thermal expansion of the intake air is suppressed. Therefore, the reciprocating (displacement type) engine is sufficiently supercharged even if no intercooler is provided so that the supercharging efficiency or effect is improved. Furthermore, the antifriction bearings which are easily susceptible to damage due to heat are satisfactorily lubricated so that their service life can be increased.

(II) The water-cooled casing is made in one piece and is therefore very simple in construction. The outer peripheries of the water-cooled casing, turbine casing and compressor casing are joined together so that the assembly of the turbocharger is facilitated. Furthermore the turbocharger itself is very simple in construction.

(III) A pair of antifriction bearings are supported by the oil film damper which in turn floats through the oil film formed between the bearing housing and the oil film damper so that the vibration damping effect is improved. In addition, the damper is prevented from rotating by means of the restriction pin so that the vibration damping effect of the damper is not adversely affected. In other words, the resistance to vibration is improved so that the service life of the bearings is increased. Furthermore, the lubricating oil is discharged in the form of a jet from small holes formed through the cylindrical wall of the damper toward the bearings so that the lubrication and cooling of the bearings are facilitated and the service life of the bearings is increased.

(IV) The oil throwers with two stepped seal rings are disposed at the ends, respectively, of the bearing portion or unit so that the positive oil seal is ensured. Moreover, the oil film damper is provided with the oil discharge outlet in communication with the oil discharge port of the bearing housing so that the mechanical losses due to the accumulation of the lubricating oil in the damper can be minimized and the lubricating oil can be smoothly discharged, whereby the above-described oil sealability is further improved.

(V) Antifriction bearings are not in the form of grooves. That is, it is not needed to machine special grooves into the surface of the turbine shaft.

What is claimed is:

1. A turbocharger comprising: a turbine casing, a compressor casing, a fluid-cooled casing joining said turbine and compressor casings, a turbine shaft extending from said compressor casing through said fluid-cooled casing into said turbine casing, a bearing casing arranged adjacent said compressor casing, axially spaced anti-friction ball bearings disposed in said bearing casing and supporting said turbine shaft in cantilever fashion, a one-piece cylindrical oil film damper engaging said ball bearings, and being spaced from said bearing casing to define a gap with said bearing casing over the axial length of said oil film damper, means for supplying oil to said gap for freely floatingly supporting said oil film damper in said bearing casing, and a pin received in a slot in said oil film damper and in a slot in said bearing casing so as to loosely connect said oil film damper to said bearing casing, such that said damper floats with respect to said bearing casing but is prevented from rotation relative to said bearing casing.

2. A turbocharger according to claim 1, wherein said oil film damper is formed with small holes through which part of the oil supplied to said gap is discharged in the form of a jet to the bearings, and has an oil discharge outlet in communication with an oil discharge port of said bearing housing.

3. A turbocharger according to claim 1, wherein said gap extends around axial ends of said oil film damper to supply part of the oil to said bearings.

4. A turbocharger according to claim 3, comprising oil throwers adjacent said ball bearings, and stepped seals between said oil throwers and said bearing casing.

* * * * *